United States Patent [19]
Kondo et al.

[11] Patent Number: 4,765,647
[45] Date of Patent: Aug. 23, 1988

[54] VEHICLE SUSPENSION SYSTEM

[75] Inventors: Toshiro Kondo, Hiroshima; Tadanobu Yamamoto, Higashihiroshima, both of Japan

[73] Assignee: Mazda Motor Corporation, Hiroshima, Japan

[21] Appl. No.: 132,166

[22] Filed: Dec. 14, 1987

[30] Foreign Application Priority Data

Dec. 15, 1986 [JP] Japan .................. 61-298166

[51] Int. Cl.$^4$ .............................................. B60G 3/00
[52] U.S. Cl. ........................................ 280/701; 280/690
[58] Field of Search ..................... 280/688, 690, 701

[56] References Cited

U.S. PATENT DOCUMENTS

| | | | |
|---|---|---|---|
| 4,269,432 | 5/1981 | Inoue et al. | 280/690 |
| 4,511,160 | 4/1985 | Inoue | 280/690 |
| 4,621,830 | 11/1986 | Kanai | 280/690 |
| 4,650,211 | 3/1987 | Tanahashi | 280/701 |

FOREIGN PATENT DOCUMENTS

56-139040 10/1981 Japan .

*Primary Examiner*—Ross Weaver
*Attorney, Agent, or Firm*—Fleit, Jacobson, Cohn & Price

[57] ABSTRACT

A vehicle suspension system having a suspension member extending in the longitudinal direction of the vehicle body for controlling the longitudinal displacement of a wheel, which comprises a shock absorbing means inclined forward or rearward and a resilient means for defining the resilient characteristics of the suspension member in the longitudinal direction. The resilient characteristics are determined to exhibit soft resilience in the direction of a horizontal component of a reaction force exerted from the inclined shock absorbing means and to exhibit hard resilience in the opposite direction to the horizontal component. According to the present invention, the horizontal component of the reaction force is largely absorbed by the resilient means. Hence, shock due to the horizontal component can be avoided and the riding qualities of the vehicle can be improved. In addition, the movement in the opposite direction to the horizontal component of the reaction force is suppressed by the resilient means. Therefore, change in the wheel attitude can be suppressed and the motive stability and the drivability of the vehicle can be improved as well.

14 Claims, 7 Drawing Sheets

VEHICLE SUSPENSION SYSTEM

BACKGROUND OF THE INVENTION

1. Field of the Invention

The present invention relates to a vehicle suspension system and, in particular, to a vehicle wheel suspension system having a suspension member extending generally in the longitudinal direction of the vehicle body which controls movement of the wheel in the longitudinal direction of the vehicle body.

2. Description of Prior Art

Various types of vehicle suspension system have been proposed for supporting wheels on the vehicle body, one of which is provided with a suspension member extending in the longitudinal direction of the vehicle body and supporting a wheel on the vehicle body. This type of suspension member includes a trailing arm or a leading arm. For example, in the trailing-arm type suspension, the trailing arm is disposed in front of the wheel and extends in the longitudinal direction of the vehicle body with its front end pivotally connected to the vehicle body and its rear end pivotally connected to a wheel support member, by which a wheel is supported swingably on the vehicle body. As the main means for providing the trailing arm with a resilient supporting characteristic in the longitudinal direction, a rubber bush means is interposed as a resilient means in each of the connecting portions of the trailing arm. If the rubber is soft and produces a large amount of deformation with respect to a longitudinal force applied thereto, the shock due to the application of longitudinal force via the wheel can be largely absorbed by the bush and the riding comfort can be improved. However, in case that the bush is deformed too much, the toe angle of the wheel tends to change excessively, which adversely affects the motive stability and drivability of the vehicle.

Accordingly, the trailing arm system is typically set such that it exhibits a resiliently soft characteristic with respect to a rearward force acting on the wheel caused by the driving resistance while it exhibits a resiliently hard characteristic with respect to a frontward force acting thereon. Japanese Utility model Public Disclosure No. 139040/1981 discloses this type of trailing arm system, in which a trailing arm extending frontward with respect to a vehicle body is connected at ends to the vehicle body and a wheel via specially designed rubber bushes, respectively. These rubber bushes provide the trailing arm system with the above-mentioned resilient characteristics.

Shock absorbing means is also provided in a conventional vehicle suspension system. Recently, a proposal has been made to use a shock absorbing member such as a damper and a spring means wherein such member is arranged so as to incline rearward for the purpose of lowering the bonnet of the vehicle body to obtain a better frontward view through the windshield or of obtaining a larger amount of room in the rear portion of the passenger compartment. In operation, upward forces acting on the wheel from the road surface, which are caused by the unevenness of the surface, are applied to the connecting end of the inclined shock absorbing member from the wheel side. Due to the inclination of the member, the reaction force in response to the upward force acts on the wheel in the inclined direction. This inclined reaction force presses the wheel in both downward and forward directions at the same time. Where the wheel is supported by the trailing arm system having a resiliently hard characteristic with respect to the forward force, the forward component of the reaction force may not be absorbed by the trailing arm system and a shock may be produced by that component. However, no proposal has been made in the prior art for improving the riding comfort of this type of suspension system with an inclined shock absorbing member.

SUMMARY OF THE INVENTION

It is therefore an object of the present invention to provide a vehicle suspension system including a suspension means extending generally in the longitudinal direction of the vehicle body for controlling the movement of a wheel in the longitudinal direction and a shock absorbing means having an inclined shock absorbing member, which provides an improved vehicle riding comfort with respect to upward force applied on the shock absorbing means from the wheel side.

Another object of the present invention is to provide a vehicle suspension system including a suspension member extending generally in the longitudinal direction of the vehicle body for controlling movement of a wheel in the longitudinal direction and a shock absorbing means having an inclined shock absorbing member, which provides improved motive stability and drivability of the vehicle as well as an improved riding qualities.

To accomplish above objects, a vehicle suspension system of the present invention having a suspension means arranged generally in the longitudinal direction of the vehicle body for controlling the movement of the wheel in the longitudinal direction comprises a shock absorbing means disposed between the wheel and the vehicle body and inclined with respect to the vertical direction which exerts reaction forces for suppressing the upward movement of the wheel, and a resilient means defining the resilient characteristic of said suspension member in the longitudinal direction of the vehicle body, said resilient characteristic being set such that it exhibits soft resilience against the horizontal component of said reaction force exerted from said inclined shock absorbing means while it exhibits hard resilience against force in the opposite direction to said horizontal component of the reaction force.

In a preferred embodiment of the present invention, the suspension system may be of a trailing-arm type which includes a trailing arm disposed in front of the wheel and is pivotally connected to the vehicle body at the forward end and to a wheel support for supporting the wheel rotatably at rearward end. The shock absorbing means can be a spring means which exerts a reaction force in response to the amount of movement of the wheel in the longitudinal direction. Alternatively, it can be a damper means which exerts a reaction force in response to the speed of movement of the wheel in the longitudinal direction. The resilient means includes bushing means provided on the ends of the suspension member extending longitudinally. The bushing means may be comprised of an outer tube, an inner tube and a resilient bushing therebetween. A desired resilient characteristic of this type can be obtained by the provision of a void or a hard portion in the resilient bushing.

According to the present invention, since the shock absorbing means is disposed inclined forwardly or rearwardly, an upward force applied to the wheel from an uneven road surface causes the shock absorbing means to exert a reaction force along the inclined direction, which acts on the wheel to force it in both the downward and longitudinal directions of the vehicle body. Namely, the horizontal force element of the reaction force acts on the wheel side, and so acts on the suspension member. The resilient characteristic of this suspension member is defined by the resilient means which is resiliently soft in the direction of the horizontal force element of the reaction force. Thus, the suspension means resiliently deformed sufficiently to prevent the shock caused by the application of the horizontal force element of the reaction force from reaching the vehicle. Therefore, the riding comfort of the vehicle having a suspension system which includes an inclined shock absorbing means can be improved. On the contrary, the resilient characteristic of the suspension means is hard in the opposite direction to the horizontal force element. Therefore, in this direction, the change in the wheel attitude can be suppressed to thereby improve the riding qualities and the drivability of the vehicle.

In another aspect of the present invention, there is provided a rear suspension system of a vehicle which includes a trailing arm member as a suspension member arranged generally in the longitudinal direction of the vehicle body for controlling the movement of the wheel in the longitudinal direction. The suspension system includes a strut-type shock absorbing means disposed between the wheel and the vehicle body and comprises a damper member and a spring member disposed coaxially around the damper member. The shock absorbing means is arranged to incline rearwardly so that its upper end is located to the rear side compared to its lower end, and is connected to the vehicle body at the upper end and to the wheel support member for rotatably supporting the wheel at the lower end, which forms a strut. The shock absorbing means of strut type exserts reaction forces for suppressing the upward movement of the wheel. A resilient means is provided for defining the resilient characteristic of the trailing arm. The resilient characteristic is determined such that it exhibits soft resilience against the horizontally forwardly acting component of said reaction force exserted from said inclined shock absorbing means while it exhibits hard resilience against force in the opposite direction to the horizontal component of the reaction force. Further, a pair of front and rear lateral link members are disposed in the lateral direction of the vehicle body between the wheel and the vehicle body. Each outward end of the lateral links is pivotally connected to the wheel support whereas each inward end thereof is pivotally connected to the vehicle body.

Other objects and advantages of the present invention will be apparent upon reading the following detailed description with reference to the attached drawings.

DESCRIPTION OF THE PREFERRED EMBODIMENT

While the present invention will be described in connection with preferred embodiments, it will be understood that we do not intend to limit the invention to these embodiments. On the contrary, we intend to cover all alternatives, modifications, and equivalents as may be included within the sprit and scope of the invention as defined by the attached claims.

Figure 1:
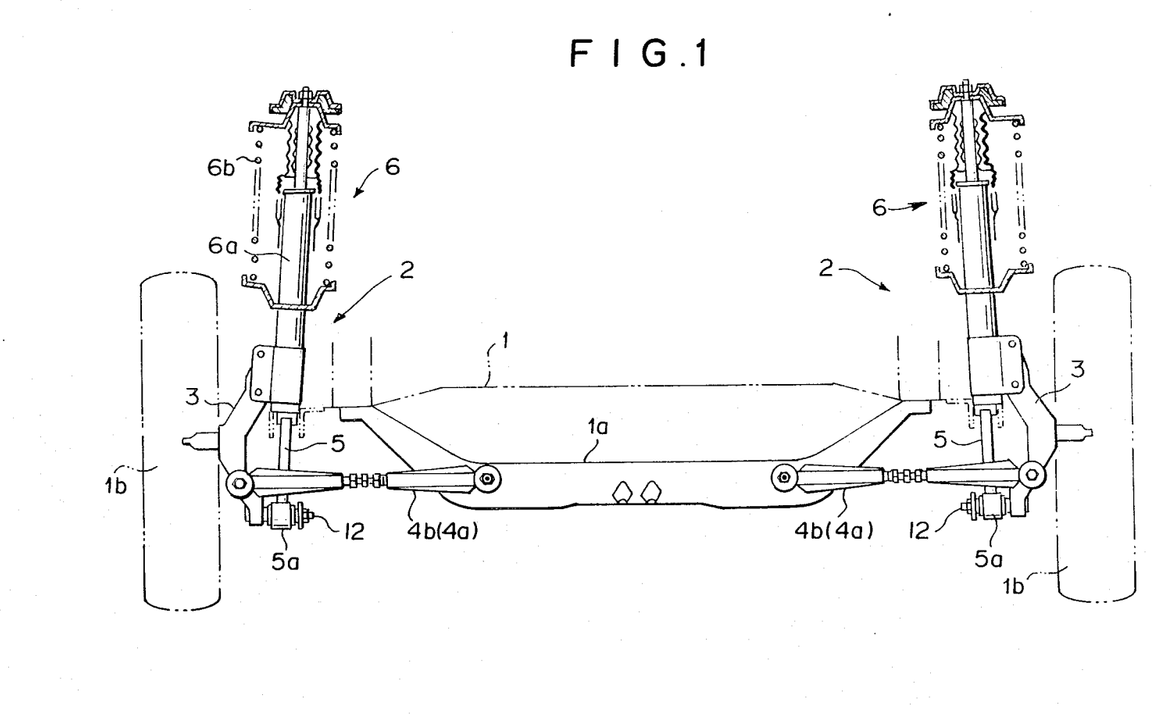
FIG. 1 is a partial front view of an example of a rear suspension system of strut type in accordance with the present invention which is incorporated with a front-engine, front drive type vehicle.

Referring now to the drawings, especially to FIG. 1, there is illustrated an example of a strut-type rear suspension system according to the present invention, which is applied to the rear wheels of a front-engine, front-drive type vehicle. The right and left side suspension systems for the right and left wheels have the same construction and in the following description will be made only as to the left suspension system. In the drawings, the same elements of the right suspension system as those of the left one are denoted by the same numerals.

Figure 2:
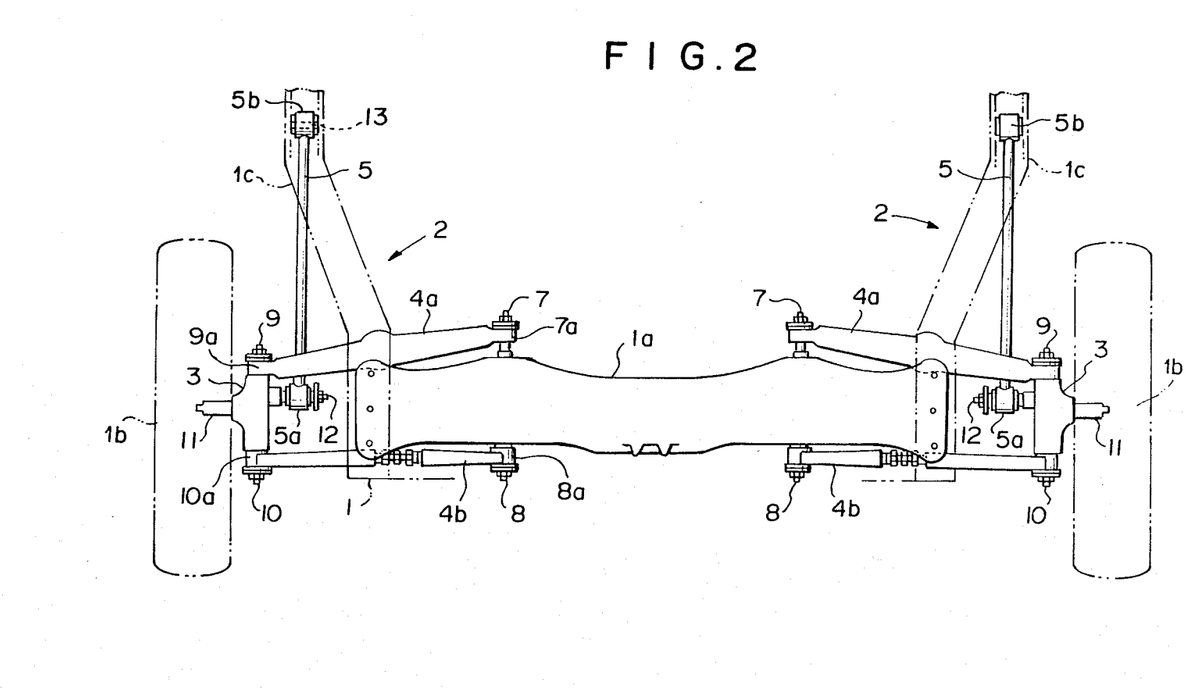
FIG. 2 is a plan view of the rear suspension system shown in FIG. 1.
Figure 3:
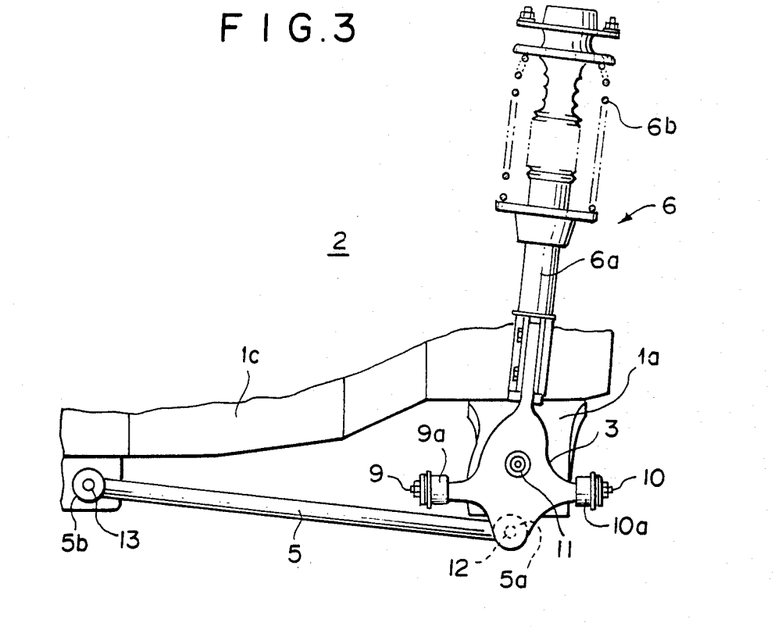
FIG. 3 is a left side view of the rear suspension system shown in FIG. 1.

In FIGS. 1 and 2, a vehicle body 1 is provided with a rear sub-frame 1a mounted thereon at the rear side and extending in the lateral direction of the vehicle body. A strut-type rear suspension system 2 for the left-side rear wheel 1b is supported by the sub-frame 1a. The suspension system 2 supports a wheel hub member 3 for rotatably supporting the rear wheel 1b. The suspension system 2 includes a pair of lateral links 4a, 4b extending laterally, a trailing arm member 5 extending in the longitudinal direction of the vehicle body 1, and a shock absorbing member 6. As best shown in FIG. 3, the shock absorbing member 6 is arranged to be inclined with respect to the vertical so that the upper end is located rearward to the lower end. The pair of lateral links comprises front and rear leteral links 4a and 4b. The front lateral link 4a is swingably connected at its inner end to a spindle 7 via a bush means 7a. The spindle 7a is attached to the front side of the sub-frame 1a and arranged longitudinally to form a rotational axis for the bush means 7a. Likewise, the rear lateral link 4b is swingably connected at its inner end to a spindle 8 of the sub-frame 1a via a bush means 8a. The front side of the wheel hub 3 is provided with A spindle 9, to which the outer end of the front lateral link 4a is swingable connected via a bush means 9a. A spindle 10 is also provided on the rear side of the wheel hub 3 and the outer end of the rear lateral link 4b is swingably connected thereto via a bush means 10a. The wheel hub 3 is also provided at its outer side with a spindle 11 projecting laterally and outwardly, around which the rear left wheel 1b is rotatably supported. As shown in FIGS. 1 and 3, the shock absorbing member 6 is connected at its lower end with the upper portion of the wheel hub 3, and is pivotally connected at its upper end to the vehicle body 1. The shock absorbing member 6 comprises a damper 6a and a spring 6b disposed around the damper 6a. As described above, the shock absorbing member 6 is inclined rearward so that more interior space is available at the rear of the vehicle.

The wheel hub 3 is provided at its inner side with another spindle 12 projecting laterally inwardly. The trailing arm 5 is pivotally connected at its rear end with the spindle 12 via a bushing means 5a, whereas it is pivotally connected at its front end with a spindle 13 via a bushing means 5b. The spindle 13 is mounted on a rear side frame 1c of the vehicle body 1.

Figure 4:
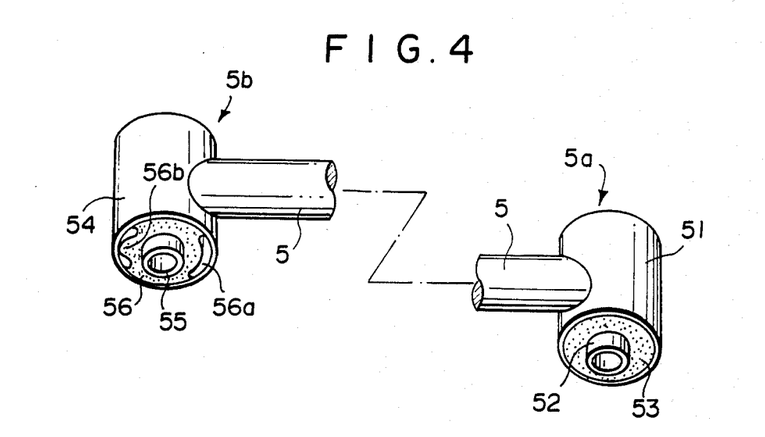
FIG. 4 is a partial perspective view of a trailing arm member used in the rear suspension system shown in FIG. 1.
Figure 5:
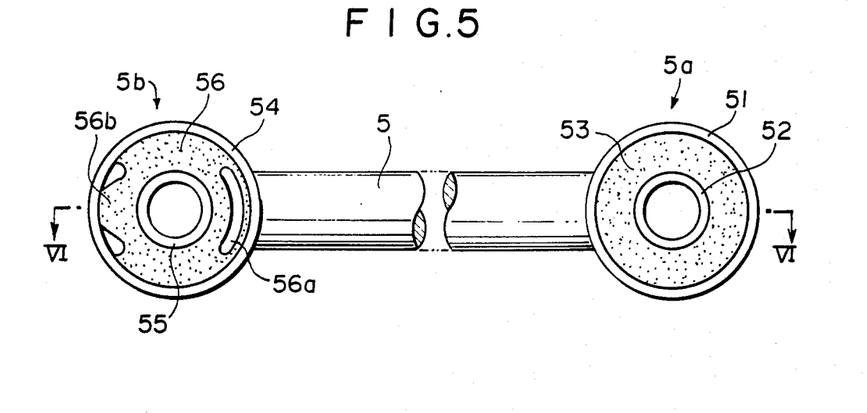
FIG. 5 is a side view of the trailing arm member shown in FIG. 4.
Figure 6:
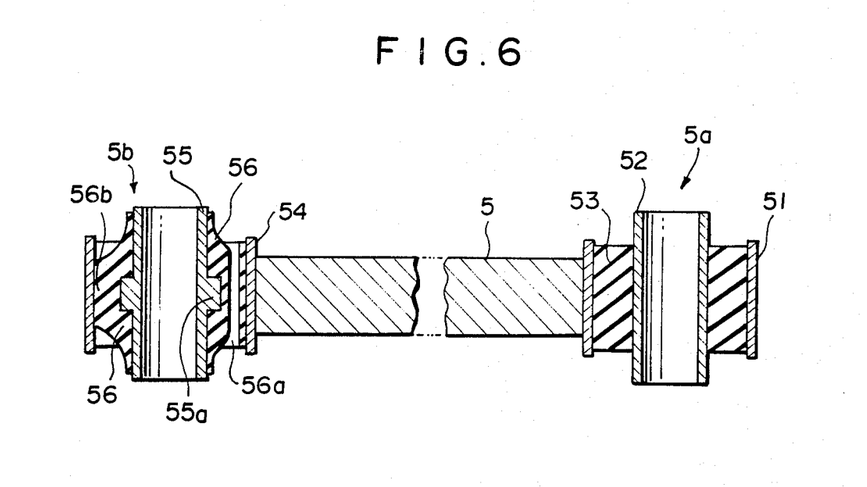
FIG. 6 is a sectional view of the trailing arm member taken along the line VI—VI shown in FIG. 5.

Referring to FIGS. 4 to 6, the rear bushing means 5a comprises a metalic outer tube 51 formed on the rear end of the trailing arm 5, a metalic inner tube 52 rotatably mounted on the spindle 12, and a tubular rubber bushing 53 firmly inserted therebetween. The rubber bushing 53 has the same rsilient characteristics with respect to forward and rearward forces. The front rubber bushing means 5b comprises a metalic outer tube 54 formed on the front end of the trailing arm 5, an inner tube 55 rotatably mounted on the spindle 13, and a tubular rubber bushing 56 firmly inserted therebetween. The rubber bushing 56 is formed therein with an arcuate void 56a extending axially at its rear side with respect to the inner tube 55. In the opposite side of the rubber bushing 56, namely in the front side portion thereof with respect to the inner tube 55, there is formed a protruding portion 56b projecting frontwardly, the top portion of which is forced to be in contact with the inner surface of the outer tube 54 in a pre-compressed condition. Further, the inner tube 55 is formed at its axially central portion with an annular knot portion 55a extending about the surface thereof in order to prevent the rubber bushing from becoming apart from the inner tube 55.

Figure 7:
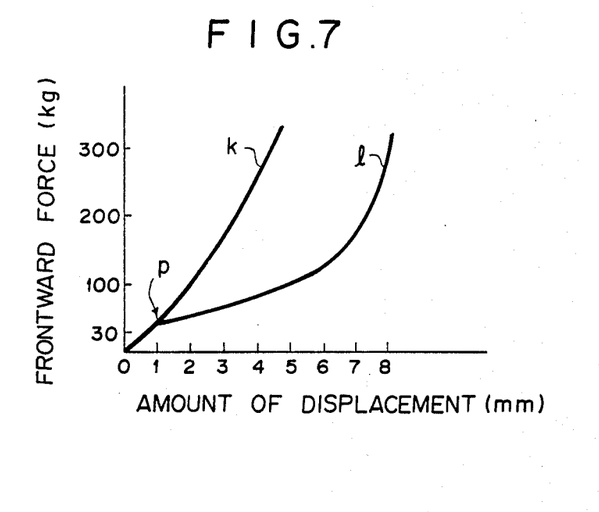
FIG. 7 shown resilient characteristic lines of the trailing arm member shown in FIG. 1 in the longitudinal direction of the vehicle body.
Figure 8:
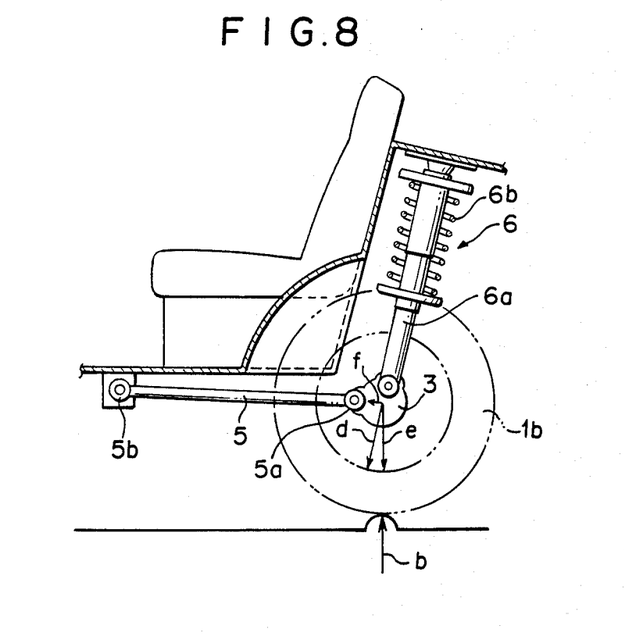
FIG. 8 shows a reaction force exerted from the strut of the rear suspension system shown in FIG. 1 when the wheel passes over a projection on the road surface and an upward force caused by that projection acts on the lower end of the strut from the wheel.

The operation of the suspension system, mainly of the trailing arm 5 in connection with FIG. 7 and 8, there will now be described. As shown in FIG. 8, when the rear wheel 1b passes over a projection on the road surface, an upward force b is applied to the wheel 1b from the road surface. This upward force is transferred to the lower end of the shock absorber 6 from the wheel hub 3. Since the shock absorber 6 is inclined rearward, a reaction force d against the upward acts on the wheel hub 3 at an angle. Therefore, there appear the horizontal and vertical components f and e of the reaction force, and that horizontal component is applied to the trailing arm 5 as a frontward force. Due to the front bushing means 5b, the trailing arm 5 exhibits a resilient characteristic line 1 such as shown in FIG. 7 which shows relationship between displacement of the trailing arm 5 and the longitudnal force acting on the trailing arm. More specifically, since the protrusion 56b of the rubber bushing 56 is in contact with the inner surface of the outer tube 54 under pre-compression, the rubber bushing 56 exhibits a hard resilient characteristic with respect to the frontward force f until the protrusion is out of contact with the inner surface of the outer tube 54, which condition is represented by the point p on the line 1. After the protrusion 56b separates from the inner surface, due to the arcuate void 56a, the rubber bushing 56 is deformed with less amount of force compared to the solid one and exhibits a resiliently softer characteristic than before. Accordingly, the shock due to the frontward force can be avoided and the riding qualities can be improved. After the void has collapsed, the rubber bushing again exhibits a resiliently hard characteristic.

In the embodiment, considering that the frontward force is acting on the trailing arm 5 due to the weight of the vehicle body 1, the amount of pre-compression induced into the rubber bushing 56 is determined so that the condition represented by the bending point p is reached under the application of only the horizontal component of the vehicle-body weight to the trailing arm 5. By this configuration, the trailing arm 5 exhibits a desired resiliently soft characteristic with respect the frontward component of the upward force, which is distinguishable from that obtained under the application of rearward force.

While, when the rearward force is applied to the trailing arm 5, the rubber bushing 56 exhibits a resilient characteristic as shown by the line k, which resembles that obtained by a solid rubber bushing. This resilient characteristic k is harder that that shown by the line 1 especially from the bending point p to the callapse of the void 56a. Therefore, wheel supported by the trailing arm 5 is suppressed in its rearward travel caused by the rearward force and in its toe change. Hence, the motive stability and the drivability of the vehicle can be improved.

In the above embodiment, the resilient characteristic has a bending point p with respect to the frontward force f because of the provision of the pre-compressed protrusion in the rubber bushing, and is the same characteristic as that with respect to the rearward force up to the bending point p. Alternatively, the trailing arm 5 can be such that it exhibits different resilient characteristics with respect to the frontward and rearward forces throughout all conditions. These kinds of resilient characteristics can be obtained by modifying the configuration of the bushing means 5a or 5b. Typical examples of the bushing means will be explained below.

Figure 9:
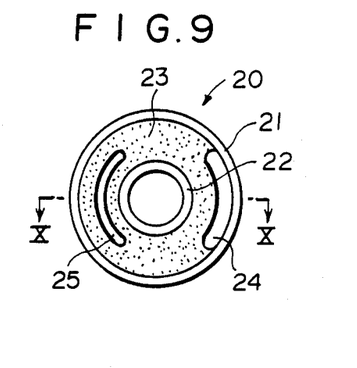
FIG. 9 shows an example of resilient means in the form of a rubber bush which is disposed on both ends of a trailing arm member.
Figure 10:
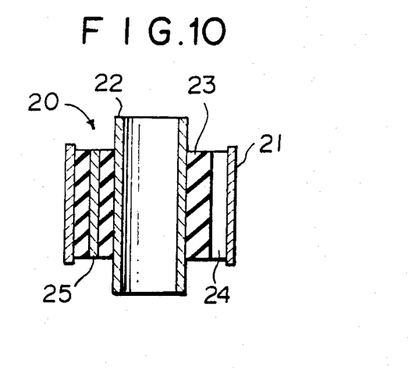
FIG. 10 is a cross-sectional view of the rubber bush shown in FIG. 9 taken along the line X—X in FIG. 9.

FIGS. 9 and 10 show an example of the bushing means. This bushing means 20 comprises an outer tube 21 formed on the front end of the trailing arm 5, an inner tube 22 rotatably supported about the spindle 13, and a tubular rubber bushing 23 firmly therebetween. An arcuate void 24 is formed between the outer surface of the rubber bushing 23 and the inner surface of the outer tube 21 at the rearward portion with respect to the inner tube 22 and extends axially. In the opposite side portion, namely in the frontward portion of the rubber bushing 23 with repect to the inner tube 22, an arcuate plate 25 is disposed which extends axially and is resiliently hard compared to the rubber bushing 23. The trailing arm having this bushing means 20 on the front end and the normal bushing means 5a on the rear end exhibits a resiliently soft characteristic with respect to the frontward force until the void 24 collapsed. Whereas, it exhibits a resiliently hard characteristic with respect to the rearward force due to the provision of the hard plate 25.

Figure 11:
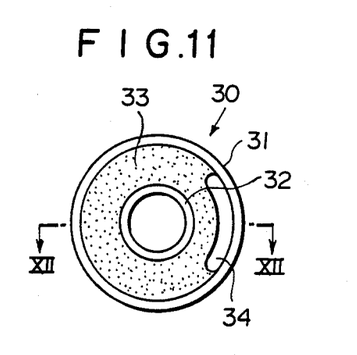
FIG. 11 shows another example of the rubber bush which is disposed on both end of a trailing arm member.
Figure 12:
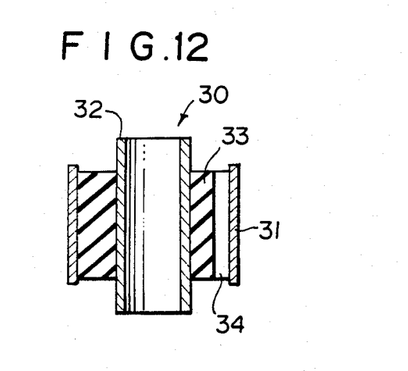
FIG. 12 is a cross-sectional view of the rubber bush shown in FIG. 11 taken along the line XII—XII in FIG. 11.

FIGS. 11 and 12 show another example of the bushing means. This bushing means 30 has the same configuration as the above bushing means 20 except for a rubber bushing 33. The rubber bushing 33 is resiliently hard and is formed therein with an arcuate groove 34 extending axially in its rearward portion with respect to the inner tube 32. The arcuate groove 34 defines an arcuate void with the inner surface of the outer tube 31. Accordingly, the bushing means 30 exhibits a resiliently soft characteristic with respect to the frontward force until the void collapses, while it exhibits a resiliently hard characteristic with respect to the rearward force.

Figure 13:
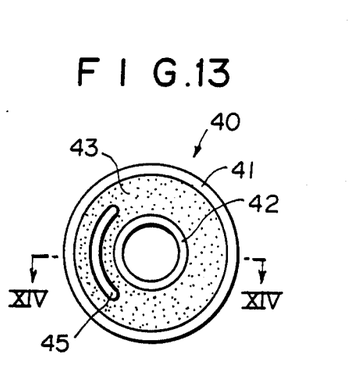
FIG. 13 shows another example of the rubber bush which is disposed on both ends of a trailing arm member.
Figure 14:
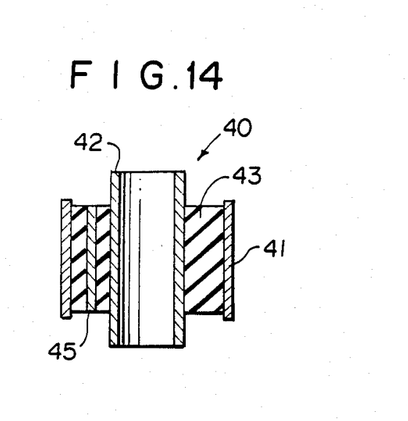
FIG. 14 is a cross-sectional view of the rubber bush shown in FIG. 13 taken along the line XVI—XVI in FIG. 13.

FIGS. 13 and 14 show still another example of the bushing means. This bushing means 40 has the same configuration as the bushing means 20 except for a rubber bushing 43. The rubber bushing 43 is resiliently soft and is inserted therein with an arcuate plate 45 extending axially at the front side portion thereof with respect to the inner tube 42. The arcuate plate 45 is resiliently harder than the rubber bushing 43. Due to the arcuate plate 45, the bushing means 40 exhibits a resiliently harder characteristic with respect to the rearward force.

In the above examples, the resilient characteristics of the trailing arm are defined by modifying the front bushing means 5b on the trailing arm. Alternatively, the rear bushing means 5a or both of front and rear bushing means can be modified to obtain desired resilient characteristics. Or a trailing arm can be divided into front and rear portions and a bushing means can be interposed between them. By modifying the resilient characteristic of the interposed bushing means, desired resilient characteristics of the trailing arm can be obtained.

Figure 15:
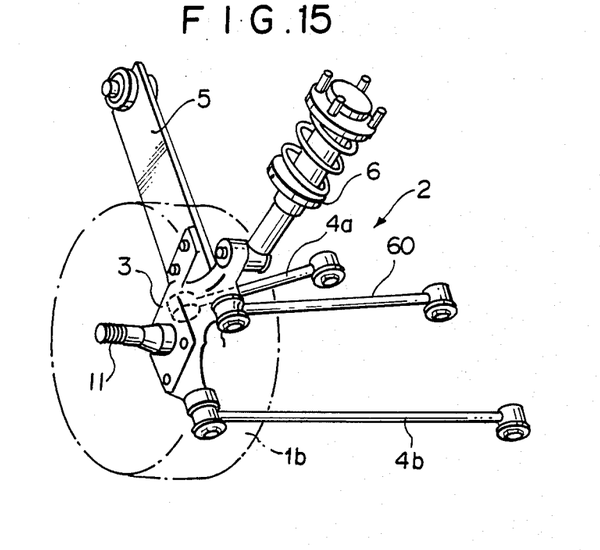
FIG. 15 shows another strut-type suspension system having a trailing arm member with the rearward end attached to a wheel hub, to which the present invention can be applied.
Figure 16:
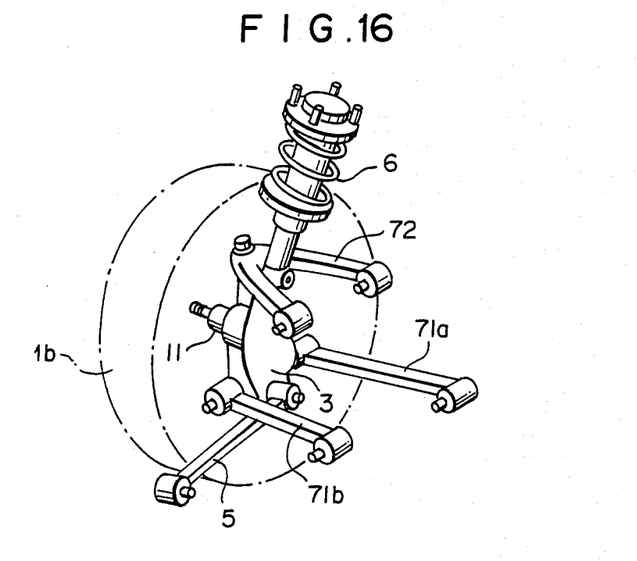
FIG. 16 shows an example of a suspension system of double wishbone type, to which the present invention can be applied.

The present invention can be adopted to other suspension systems so long as it is provided with a longitudinally extending suspension member such as a trailing arm and an inclined shock absorber producing a horizontal force element acting on the longitudinally extending suspension. An example of this type of suspension system is shown in FIG. 15. This suspension system has the same configuration as the above-mentioned suspension system 2 except that the trailing arm 5 is firmly connected at its rear end to the wheel hub 3 and an upper control lateral link 60 is provided for controlling the attitude of the wheel 1b. Another example of the suspension is shown in FIG. 16, which is of the double wishbone type and includes a pair of lower lateral links 71a, 71b and an A-shaped upper lateral link 72 for controlling the attitude of the wheel 1c, as is known.

We claim:

1. A vehicle suspension system which has a suspension member arranged generally in the longitudinal direction of the vehicle body for controlling the longitudinal displacement of a wheel, comprising a shock absorbing means disposed between the wheel and the vehicle body for exerting a reaction force to suppress the upward movement of the wheel which is arranged to incline longitudinally with respect to the vertical so that it produces a horizontal component of said reaction force acting on said suspension member, and a resilient means defining the resilient characteristics of said suspension member in the longitudinal direction, said resilient characteristics being set to exhibit soft resilience against the horizontal component of said reaction force exerted from said inclined shock absorbing means and to exhibit hard resilience against force in the opposite direction to said horizontal component of the reaction force.

2. The vehicle suspension system as set forth in claim 1, wherein said suspension system is for supporting a rear wheel.

3. The vehicle suspension system as set forth in claim 1, wherein said suspension member is a trailing arm disposed in front of the wheel and is pivotally connected to the vehicle body at a forward end and to a wheel support member for supporting the wheel rotatably at a rearward end.

4. The vehicle suspension system as set forth in claim 1, wherein said shock absorbing means includes a spring means which exerts a reaction force in response to the amount of movement of the wheel in the vertical direction.

5. The vehicle suspension system as set forth in claim 1, wherein said shock absorbing means includes a damper means which exerts a reaction force in response to the speed of movement of the wheel in the vertical direction.

6. The vehicle suspension system as set forth in claim 5, wherein said suspension system is of a strut type and a strut member thereof is defined by said damper means which is firmly attached at its lower end to a wheel support for supporting the wheel rotatably and is supported at its upper end on the vehicle body.

7. The vehicle suspension system as set forth in claim 1, further comprising a pair of front and rear lateral link members, each of which is pivotally connected to the vehicle body at its laterally inner end and to a wheel support for supporting the wheel rotatably at its laterally outer end.

8. The vehicle suspension system as set forth in claim 1, further comprising a pair of upper and lower link members for controlling the camber of the wheel.

9. The vehicle suspension system as set forth in claim 1, wherein said resilient means includes a resilient bushing means provided at least on one end of said suspension member.

10. The vehicle suspension system as set forth in claim 9, wherein said resilient bushing means is interposed between an outer tube formed on one of said suspension member and an inner tube supported on the vehicle body or a wheel support for supporting the wheel rotatably.

11. The vehicle suspension system as set forth in claim 10, wherein said resilient bushing means is provided with a void for obtaining said resilient characteristics.

12. The vehicle suspension system as set forth in claim 10, wherein said resilient bushing means is provided therein with an inserted member which is resiliently harder that the resilient bushing means itself so as to obtain said resilient characteristics.

13. The vehicle suspension system as set forth in claim 10, where said resilient bushing means is formed on its outer surface with a protrusion which is in contact with the inner surface of said outer tube with predetermined pressure to thereby obtain said resilient characteristics.

14. A rear vehicle suspension system comprising:

a trailing arm member arranged generally in the longitudinal direction of the vehicle body for controlling the movement of a rear wheel in the longitudinal direction;

a strut-type shock absorbing means disposed between the rear wheel and the vehicle body for exerting a reaction force to suppress the upward movement of said rear wheel which includes a damper member connected to the vehicle body at the upper end to the wheel support member for rotatably supporting the rear wheel at the lower end and a spring member disposed coaxially around the damper member, said shock absorbing member being arranged to incline rearward with respect to said rear wheel so that it produces a horizontally forward component of said reaction force acting on said trailing arm member;

a resilient means provided for defining the resilient characteristics of the trailing arm such that it exhibits soft resilience against said horizontally forward component of the reaction force while it exhibits hard resilience against a horizontally rearward force; and, a pair of front and rear lateral link members disposed in the lateral direction of the vehicle body between said rear wheel and the vehicle body, each of which is pivotally connected at its laterally outer end to said wheel support and at its laterally inner end to the vehicle body.

* * * * *